Sept. 20, 1955    J. H. L'ABÉE-LŪND    2,718,151
MECHANICAL SEAL
Filed Jan. 26, 1951
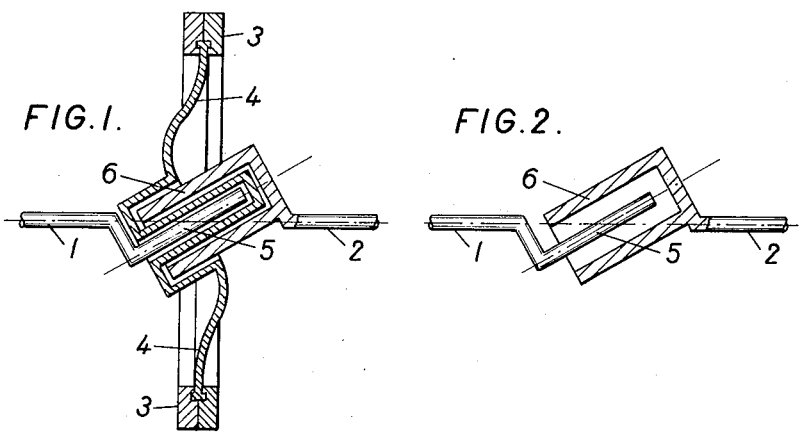
Inventor
Johan H. L'Abee-Lund
By Young, Emery & Thompson
Attys.

2,718,151

MECHANICAL SEAL

Johan Henrik L'Abée-Lund, Nordstrand/Oslo, Norway, assignor to L'Abée-Lund A/S., Nordstrand/Oslo, Norway Application January 26, 1951, Serial No. 208,002

Claims priority, application Norway November 18, 1950

5 Claims. (Cl. 74—18.1)

This invention relates to means by which it is possible to transmit mechanical power or torque between two coaxial shafts, one on each side of an impermeable wall.

An object of this invention is to provide a crank on each shaft in angular relation to the axis of the shafts and overlapping each other, one of the said cranks being constructed as a pin or a rod adapted to enter into the other crank in spaced relation thereto, in such a way that the membrane as a skin or wall can be shaped to fill out the space between the two cranks.

A further object of the invention resides in means for the introduction of a lubricant to the cranks. The invention thus comprises means for the mechanical connection of two coaxial shafts to a closed or unperforated wall, comprising a flexible or yielding membrane with the two shafts provided with corresponding telescopically overlapping cranks, inclined in relation to the axis of the shafts, which cranks are adapted to be received within each other in spaced relation.

A further object of the invention consists therein that the said cranks are connected to the shafts in such a way that the common axis of the two cranks will intersect the axis of the shafts substantially in the middle point of the cranks.

A further object of the invention is to arrange the two shafts in such relation to the plane of the membrane through the shafts that the intersection of the axis of the cranks and the axis of the shafts will fall substantially in the normal plane of the membrane.

A further object of the invention consists in the use of a power transmitting head for the purpose of transmitting power or torque from one shaft to the other, the said power transmitting head being joined as a unit with the membrane proper.

A still further object of the invention consists in the construction of the power transmitting head.

A further object of the invention consists in the arrangement of fastening bolts in the power transmitting head, each adapted to anchor one of the two cranks to the head.

Further objects will be apparent from the following description when considered in connection with the accompanying drawing which illustrates two embodiments.

In the drawing Fig. 1 is a diagrammatic cross section through a power transmitting arrangement according to the invention, and Fig. 2 corresponds to Fig. 1, but in Fig. 2 the membrane or the wall is omitted for the sake of clarity.

In the drawing 1 and 2 are the two shafts, between which power is to be transmitted through a closed wall. The wall is in the drawing numbered 3. The wall comprises a flexible or yielding membrane 4.

The shafts 1 and 2 are both provided with cranks 5 and 6 respectively, which are shaped in such a way that they overlap telescopically and are positioned in angular relation to the axis 1 and 2 respectively, which is clearly shown in Fig. 2. The crank 5 has an outside diameter which is so much smaller than the inner diameter of the crank 6 that a space will be left between the two cranks when they are entered together. According to the invention the membrane 4 is given a central area with such a shape that this central part, when the members are put together, will fill out the open space between the cranks 5 and 6, whereby a completely closed wall between the two sides of the wall 3 is provided.

When one of the shafts 1 or 2 is rotated, this rotation will automatically be transmitted to the other shaft, the cranks being journalled in the skin or wall which is formed by the membrane therebetween. The membrane on its side will, in a manner known per se in power transmitting means of this type, perform a wavy movement.

By suitable selection of the dimensions and positions of the cranks one may easily obtain the result that the common axis of the cranks 5 and 6 will intersect the axis of the shafts 1 and 2, substantially in the middle point of the cranks 5 and 6, and preferably at the same time in the normal plane of the membrane.

From the foregoing will appear that according to this invention among others it has been made possible to arrange cranks in such a way that each crank in itself may be said to form a two-armed lever having a tilting point in the axis of the shafts between which the power is to be transmitted. This construction has evidently large importance, as well with respect to the necessary dimensions in order to transmit a certain admit of power, as to transmit a dynamic balance of the complete construction.

I claim:

1. A mechanical connection between two coaxial shafts comprising a flexible membrane, a crank for each shaft, each crank being inclined relative to the axis of its shaft, one crank having a hollow portion into which the other crank projects in telescopically spaced relation therebetween and being connected to the said shafts so that the common axis of the two cranks will intersect the common axis of the two shafts substantially in the middle point of the two cranks, said membrane having a section shaped as a tubular wall to be received in the hollow portion of said one crank and to receive the said other crank.

2. A mechanical connection between two coaxial shafts comprising a flexible membrane, a crank for each shaft, each crank being inclined relative to the axis of its shaft, one crank having a hollow portion into which the other crank projects telescopically in spaced relation therebetween and being connected to the said shafts so that the common axis of the two cranks will intersect the common axis of the two shafts substantially in the middle point of the two cranks, the two cranks being located in position in relation to the normal plane of the membrane so that the point of junction between the axes of the cranks and the axis of the two shafts substantially coincide with the said plane of the membrane, said membrane having a section shaped as a tubular wall to be received in the hollow portion of said one crank and to receive the said other crank.

3. A mechanical connection between two coaxial shafts comprising a crank for each shaft, a flexible membrane having as a part thereof a power transmitting head which from one side of the membrane has a bore to receive and journal the crank of one of the shafts and having an inclined position in relation thereto, said head being provided with an annular bore on the other side of the membrane arranged coaxially and surrounding the first-mentioned bore to receive and journal the crank of the other shaft and being shaped as a hollow cylinder so that the two cranks will pass into each other in spaced relation to each other, a wall in the said head between the two bores filling the said space between the two cranks, and the two cranks being connected to the said shafts so that the common axis of the two cranks will intersect the common axis of the two shafts substantially in the middle point of the two cranks.

4. A mechanical connection for two coaxial shafts comprising a flexible membrane, a crank for each shaft inclined relative to its shaft and overlapping each other telescopically leaving a space therebetween, said membrane having a section shaped as a tubular wall to be received in and fill the said space between the said cranks, and said cranks being in the form of two armed levers with the tilting point in the axis of the two shafts the common axis of the two cranks intersecting the common axis of the two shafts substantially in the middle point of the two cranks.

5. A mechanical connection for two coaxial shafts comprising a flexible membrane, a crank for each shaft, inclined relative to the shafts overlapping each other telescopically to provide a space therebetween, the cranks connected to the said shafts so that a common axis of the two cranks will intersect the common axis of the two shafts substantially in the middle point of the two cranks, said membrane having a section shaped as a tubular wall to receive and fill the space between the said cranks, and said cranks being formed as two armed levers with the tilting point in the axis of the two shafts.

References Cited in the file of this patent

UNITED STATES PATENTS

| | | |
|---|---|---|
| 1,436,444 | Holmes | Nov. 21, 1922 |
| 1,818,973 | De Giers | Aug. 18, 1931 |
| 2,610,410 | L'Abée-Lund | Sept. 16, 1952 |

FOREIGN PATENTS

| | | |
|---|---|---|
| 98,132 | Switzerland | Mar. 1, 1923 |
| 823,759 | France | Oct. 25, 1937 |